United States Patent [19]
Edwards

[11] Patent Number: 5,363,808
[45] Date of Patent: Nov. 15, 1994

[54] PET LITTER BOX

[76] Inventor: Richard A. Edwards, 4819 N. 7th St., Philadelphia, Pa. 19120

[21] Appl. No.: 203,040

[22] Filed: Feb. 28, 1994

[51] Int. Cl.$^5$ .............................................. A01K 29/00
[52] U.S. Cl. ................................................... 119/166
[58] Field of Search ................................ 119/165, 166

[56]  References Cited
U.S. PATENT DOCUMENTS

| | | | |
|---|---|---|---|
| 3,100,474 | 8/1963 | Schneider | 119/166 |
| 3,796,188 | 3/1974 | Bradstreet | 119/166 |
| 3,908,597 | 9/1975 | Taylor | 119/166 |
| 4,325,822 | 4/1982 | Miller | . |
| 4,602,593 | 7/1986 | Gross | 119/166 |

*Primary Examiner*—Gene Mancene
*Assistant Examiner*—Thomas Price
*Attorney, Agent, or Firm*—Richard G. Litman

[57]  ABSTRACT

The instant invention provides a pet litter box for a household pet such as a cat or a dog. The pet litter box may include a housing having several vertically spaced slots located in one face of the housing and several grooves located on an interior surface of the housing and associated with each slot. The housing may also have a top opening and a bottom opening. A first imperforate tray may be positioned within a bottom slot of the housing and covered with pet litter material. After the pet has used the litter box on several occasions, a perforated tray may be positioned within an upper groove of the housing. Further, a second imperforate tray may be positioned within the litter box above the perforated tray. The litter box may be inverted and shaken, so unused litter material separates from commingled pet waste and used litter material and passes through apertures in the perforated tray. The first imperforate tray is removed from the litter box to expose the commingled pet waste and used litter material, so the waste may be removed from the litter box. The litter box is then ready for reuse, while remaining in the inverted position. A plurality of cleaning elements, such a brushes, may be provided to clean or brush a surface of an imperforate tray during removal from the pet litter box.

11 Claims, 2 Drawing Sheets

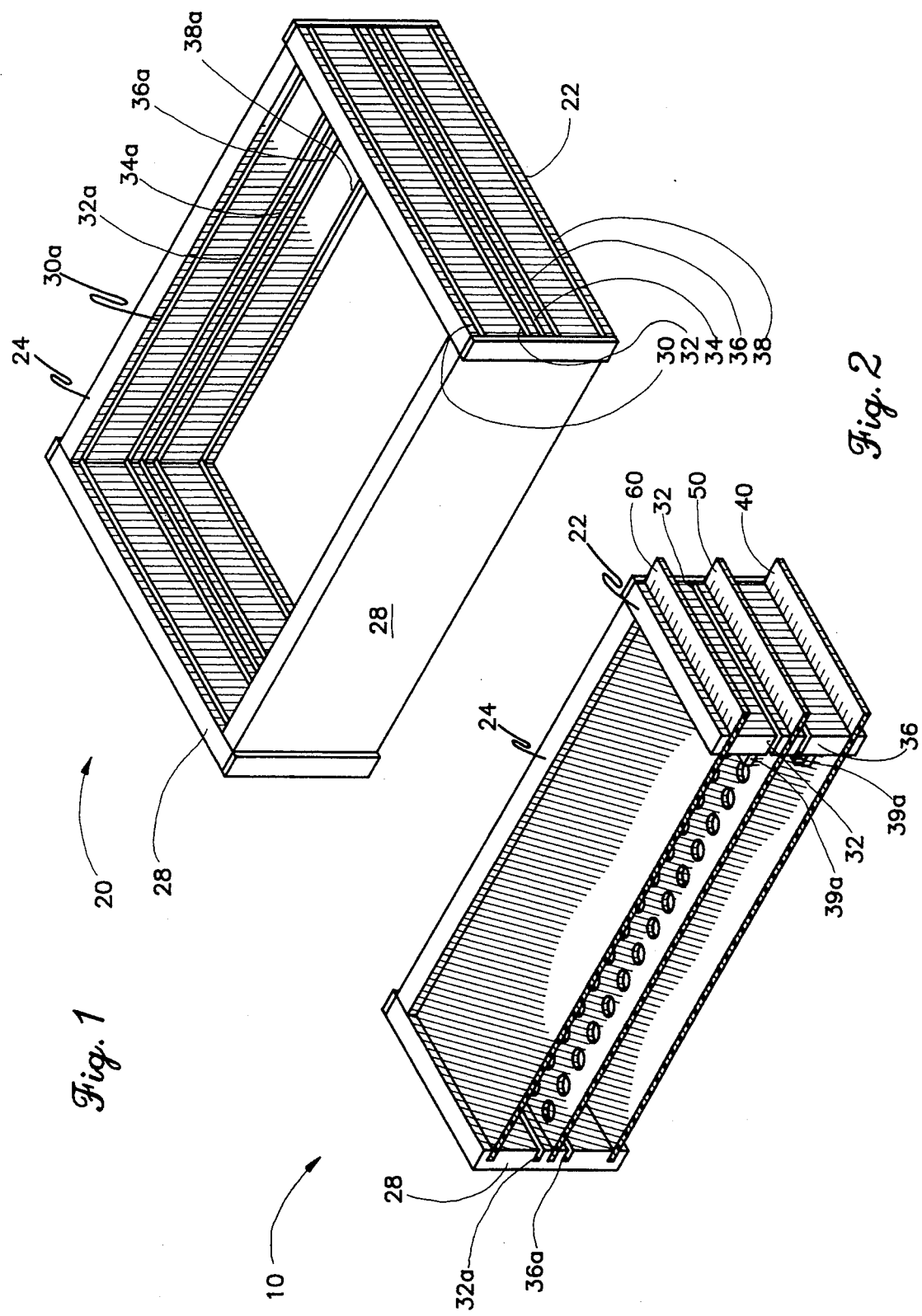

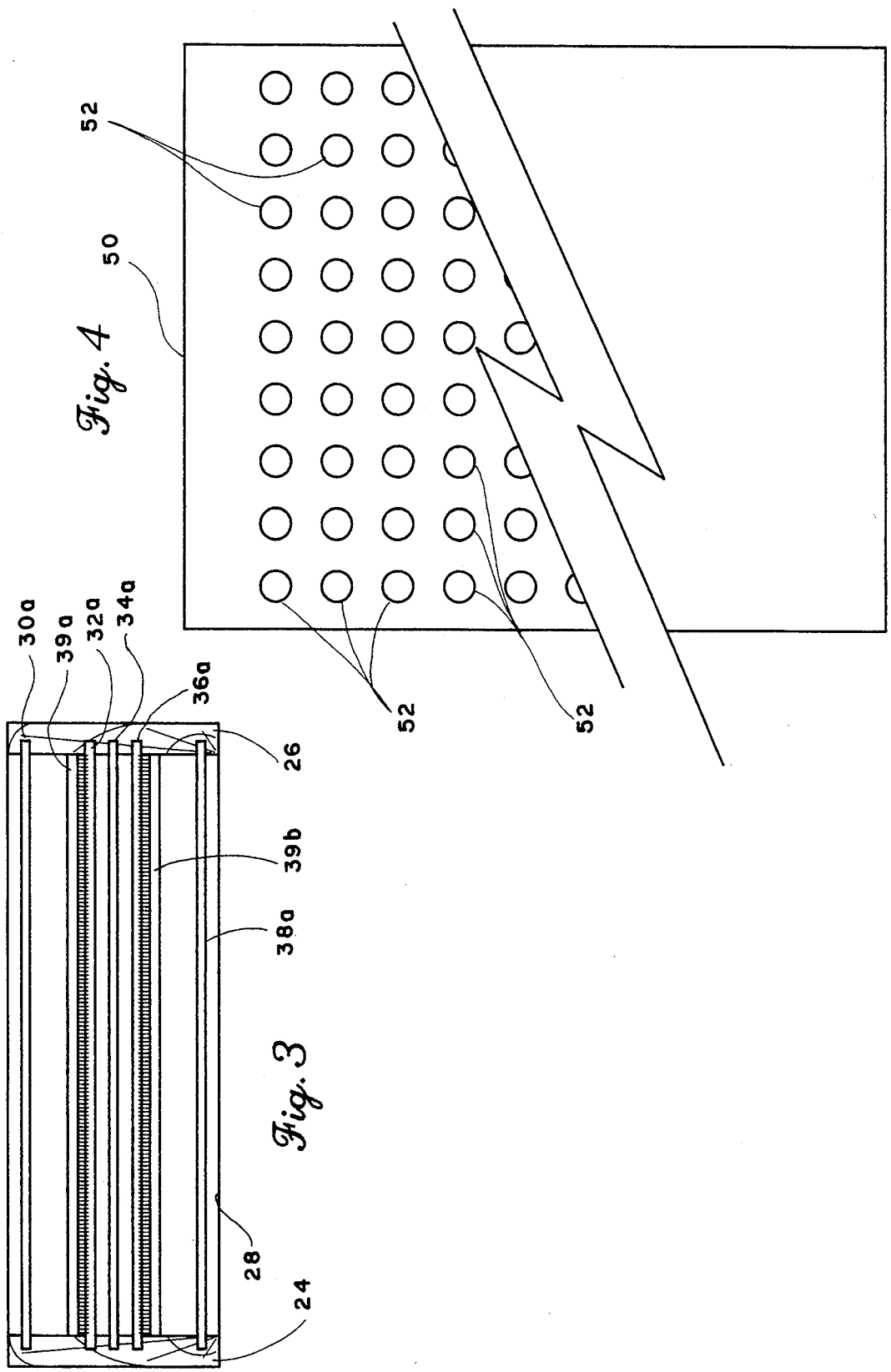

PET LITTER BOX

BACKGROUND OF THE INVENTION

1. Field of the Invention

The present invention relates to a litter box for a pet, and more particularly, to an invertible cat litter box with a sifting feature so a pet owner may economize the use of pet litter by removing pet waste from the pet litter box and retaining the unused pet litter within the pet litter box.

2. Description of the Prior Art

Many litter boxes for pets such as dogs and cats have proposed, so the pet may relieve itself of bodily waste within the home of the pet owner. However, the prior art litter boxes suffer from a number of drawbacks. Some pet litter boxes fail to provide a mechanism for separating the excrement from the litter, while other litter boxes are very difficult to clean due to intricate or complex arrangement of components.

With a litter box having the above drawbacks, a pet owner must engage in the unpleasant and malodorous task of directly separating the litter from the excrement and/or directly cleaning the excrement from the litter box. Alternatively, the pet owner may resort to the uneconomical practice of discarding all of the contents in the litter box, which results in significant wastage of the pet litter material.

Litter boxes have been proposed with a sorting feature that separates the excrement from the litter material and also facilitate cleaning the litter box. U.S. Pat. No. 3,100,474 issued to Leonard Schneider on Aug. 13, 1963 discloses a pet commode employing a removable plate, a screen and a solid removable tray. Litter is provided on top of the plate for use by the pet. The pet commode is cleaned by sliding the plate out of the commode so the litter and pet excrement falls onto the screen. The screen has openings that allow the unused pet litter to fall to a bottom tray, while retaining the excrement and used cat litter.

U.S. Pat. No. 3,796,188 issued to Samuel Bradstreet on Mar. 12, 1974 discloses a reusable sanitary pet lavatory having a pair of identical nested box-like receptacles having a screened or perforated plate positioned above a slidable floor member. Pet litter material is provided within the upper receptacle for use by the pet. The lavatory may be cleaned by opening the floor member of the upper receptacle so unused litter material passes through the screened or perforated plate into the lower receptacle. The pet excrement is retained by the screened plate of the upper receptacle for disposal. The lower receptacle with the pet litter may then be placed on top of the other receptacle.

U.S. Pat. No. 3,908,597 issued to Chester Taylor on Sept. 30, 1975 discloses a self-straining animal litter box having a central receptacle divided by a partition. Upper and lower trays having a screen and a rectangular side wall are placed above and below the partition, respectively. A cover with a rectangular skirt is placed near a tray. The cover on the upper tray is removed and pet litter material is placed in the upper tray for use by the pet. The litter box is cleaned by removing the partition, which engages a pair of flexible flaps, and unused litter material passes through the screens in the trays. Solid pet excrement is retained in the upper tray for disposal. After disposing of the solid pet excrement, the litter box is flipped over or inverted for reuse.

U.S. Pat. No. 4,325,822 issued to John Miller on Apr. 20, 1982 discloses a pet litter separator including a pair of opposed receptacles. Each receptacle has a projecting lip surrounding an upper edge thereof. A central slidable screen is also provided with an upper and lower track which is adapted to engage the projecting lips of the receptacles. The top receptacle may be removed and pet litter.

None of the above inventions and patents, taken either singly or in combination, is seen to describe the instant invention as claimed.

SUMMARY OF THE INVENTION

The present invention provides a pet litter box that is inexpensive to manufacture and maintain.

Accordingly, it is a principal object of the invention to provide a pet litter box with few parts and is durable and easy to use and clean.

It is another object of the invention to provide a pet litter box having simple components, such as sliding trays, to simplify the process of emptying pet refuse from the litter box and retaining the unused pet litter material.

It is an object of the invention to provide improved elements and arrangements thereof in an apparatus for the purposes described which is inexpensive, dependable and fully effective in accomplishing its intended purposes.

The instant invention provides a pet litter box for a household pet such as a cat or a dog. The pet litter box may include a housing having several vertically spaced slots located in one face of the housing and several grooves located on an interior surface of the housing and associated with each slot. The housing may also have a top opening and a bottom opening.

A first imperforate tray may be positioned within a bottom slot of the housing and covered with pet litter material. After the pet has used the litter box on several occasions, a perforated tray may be positioned within an upper groove of the housing. Further, a second imperforate tray may be positioned within the litter box above the perforated tray.

The litter box may be inverted and shaken, so unused litter material separates from commingled pet waste and used litter material and passes through apertures in the perforated tray. The first imperforate tray is removed from the litter box to expose the commingled pet waste and used litter material, so the waste may be removed from the litter box. The litter box is then ready for reuse, while remaining in the inverted position. A plurality of cleaning elements, such a brushes, may be provided to clean or brush, a surface of an imperforate tray upon removal from the pet litter box.

These and other objects of the present invention will become readily apparent upon further review of the following specification and drawings.

BRIEF DESCRIPTION OF THE DRAWINGS

FIG. 1 is a perspective view of a housing of a pet litter box according to the invention.

FIG. 2 is a perspective view in partial cross-section of the pet litter box including two imperforate trays and a perforated tray.

FIG. 3 is a cross-sectional view in elevation from inside the pet litter box of FIG. 2.

FIG. 4 is a top plan view of a perforated tray of the pet litter box, including break lines.

Similar reference characters denote corresponding features consistently throughout the attached drawings.

DETAILED DESCRIPTION OF THE PREFERRED EMBODIMENT

A pet litter box is advantageous, as a pet may eliminate bodily wastes within the household without creating a mess for the pet owner. FIGS. 1 and 2 show a pet litter box 10 including a housing 20 according to the instant invention.

According to the instant invention simplified components are used that substantially disassemble the pet litter box to minimize the initial and replacement costs of the pet litter box, while facilitating use and cleaning of the pet litter box. As shown in FIGS. 1 and 2, the pet litter box, which is most suitable for a small pet such as a cat or a dog, requires only housing 20, and planar elements or trays 40, 50, 60.

Housing 20 may have a rectangular configuration with a front or first side 22, a second side 24, a third side 26 and a rear or fourth side 28. The housing may be made from any conventional material that is lightweight and non-corrosive, such as wood, plastic, metal or aluminum. According to the preferred embodiment, the housing may be constructed of wooden sides secured together by mechanical fasteners such as nails or screws, or by welding or gluing with an adhesive. It is also contemplated to provide a unitary structure that may be formed in an injection molding process.

The sides of housing 20 define a hollow area having an open top and open bottom. Front side 22 of the housing defines a plurality of slots. The slots may be gaps between a plurality of spaced apart strips of material. Alternatively, a single sheet of material may have slots cut, milled or otherwise formed therein. According to the preferred embodiment, give vertically spaced slots are provided, however, the invention may have more or fewer slots in accordance with the wishes of the user. As shown in FIGS. 1 and 2, the five slots are a first or top slot 30, a second slot 32, a third or central slot 34, a fourth slot 36 and a fifth or bottom slot 38.

Sides 24, 26, 28 of the housing may cooperate to define a plurality of continuous vertically spaced grooves. As shown in FIGS. 1 and 2, the housing includes first or top groove 30a, a second groove 32a, a third or central groove 34a, a fourth groove 36a and a fifth or bottom groove 38a. Each groove is associated with a respective slot in front face 22, as the grooves are aligned with or connected to the slots to define a plurality of receiving areas for trays or planar elements 40, 50, 60.

The housing may also be provided with a cleaning element, which is connected to front side 22 and/or sides 24, 26 for cleaning a tray within the pet litter box. A brush may be located proximal to a slot, so the tray is brushed or wiped to remove an litter material adhering to the tray. According to the preferred embodiment, a downwardly directed brush or brush element 39a is located proximal to second slot 32 and an upwardly directed brush or brush element 39b is located proximal to fourth slot 36.

The trays may be made from any conventional material that is lightweight and non-corrosive, such as wood, plastic, metal or aluminum. According to the preferred embodiment, three trays are provided. Two trays are imperforate trays, which are solid and contain no apertures or voids. The third tray is a perforated tray that contains several apertures or voids.

As shown in FIG. 2, a first imperforate tray 40 may be placed through slot 38 and into groove 38a. The length of tray 40 is sized so a portion of the tray extends out from the housing, when the tray abuts against the portion of groove 38a within rear side 28 to provide a convenient handle portion.

The width of tray 40 (see FIGS. 2 and 3) is sized so the tray width is less than the greatest distance between opposite edges of slot 38. The width of tray 40 is further sized so the tray width is greater than the minimum distance between opposing sides 24, 26 so the tray completely covers an opening in the pet litter box. The thickness of tray 40 is sized to closely approximate without exceeding the thickness of slot 38.

Trays 50 and 60 have been designed to take into account the same length, width and thickness considerations as the above considerations for tray 40. According to the preferred embodiment, imperforate trays 40, 60 are made of wood to minimize costs and perforated tray 50 is made of a plastic material.

The inventor has found through experimentation that circular apertures 52, which are $\frac{1}{4}''$ to $\frac{1}{2}''$ in diameter and are spaced $\frac{1}{4}''$ to $\frac{1}{2}''$ apart, provide the best results when sifting the refuse from the unused pet litter material. When required to provide such a large number of apertures within such limited spacing requirements, the inventor has found that wood is not a practical material. Plastic and metal are both suitable, however, plastic is typically lighter and less expensive than metal.

The pet litter box according to the invention is used as follows. Housing 20 is placed in a suitable household location for a pet litter box. A user may slide a first imperforate tray 40 through bottom slot 38 and into bottom groove 38a to entirely cover the bottom opening in housing 20.

Approximately 2" of clumping-type pet litter material is placed within the pet litter box for the pet's use. Pet litter material such as cat litter material is commercially available as a granular, moisture absorbent material, which forms clumps when directly exposed to solid and liquid pet waste. These clumps are of significantly greater size than the individual grains of moisture absorbent pet litter material.

When it is time to clean the pet litter box, a user may slide perforated tray 50 through central slot 34 and into central groove 34a. A user may slide a second imperforate tray 60 through top slot 30 and into top groove 30a to entirely cover the top opening of the housing. The housing is then inverted so second imperforate tray 60 is located below first imperforate tray 40.

The housing is agitated or shaken so unused pet litter material is sifted from clumps of commingled pet waste and pet litter material. The sifted unused pet litter material passes through apertures 52 and falls onto second imperforate tray 60, while the clumps, which are larger than perforations 52, are retained on top of perforated tray 50.

The first imperforate tray 40 may be removed to uncover the opening in the housing and expose the clumps of commingled pet waste and pet litter material. The user may slide an imperforate tray through slot 32 and into groove 32a to entirely enclose the sifted unused pet litter material between the imperforate tray in slot 32 and the imperforate tray in slot 30.

The refuse may dumped or otherwise removed from the pet litter box, while the imperforate trays prevent the unused pet litter material in the box from being dumped with the refuse. After dumping the refuse, the imperforate tray in slot 32 is removed. Brush element 39a may wipe or brush any pet litter material adhering to an interior surface of the imperforate tray in slot 32.

According to the preferred embodiment the pet litter box is approximately $7\frac{1}{4}"$ H×15"W×$24\frac{1}{2}$L with approximately $\frac{1}{4}"$ wide slots. The first slot is located approximately $\frac{1}{2}"$ from the top of the box and is spaced approximately two inches from the second slot. Both the second slot and the fourth slot are located approximately $\frac{1}{2}"$ from the third or central slot. The fifth or bottom slot is located approximately $\frac{1}{2}"$ from the bottom of the box and is spaced approximately two inches from the fourth slot.

It is to be understood that the present invention is not limited to the preferred embodiment described above, but encompasses any and all embodiments within the scope of the following claims.

I claim:

1. A pet litter box comprising:
   a housing including a first opening, a second opening, and defining a plurality of grooves within an interior surface of said housing and a plurality of slots, each of said slots connected to and associated with one of said grooves;
   a plurality of planar elements, each of said planar elements configured to slide through one of said slots and within one of said grooves; and
   a cleaning element connected to said housing wherein said cleaning element is a brush extending substantially the entire length of one of said slots.

2. The pet litter box according to claim 1, wherein said plurality of planar elements comprises at least a first imperforate planar element located in one of said grooves.

3. The pet litter box according to claim 2, further comprising:
   a perforated planar element located in one of said grooves and above said first imperforate planar element.

4. The pet litter box according to claim 3, further comprising:
   a second imperforate planar element located in one of said grooves and above said first imperforate planar element and said perforated planar element.

5. The pet litter box according to claim 3, wherein said perforated planar element includes a plurality of circular apertures.

6. The pet litter box according to claim 5, wherein said perforated planar element includes plastic material.

7. The pet litter box according to claim 1, wherein said housing is configured as a rectangular housing, said slots are located within one side of said rectangular housing, and said grooves are located within three sides of said housing.

8. A pet litter box comprising:
   a housing including a first opening, a second opening, and defining a plurality of grooves within an interior surface of said housing and a plurality of slots, each of said slots connected to and associated with one of said grooves;
   a plurality of planar elements, each of said planar elements configured to slide through one of said slots and within one of said grooves; and
   a cleaning element connected to said housing, said cleaning element having at least two brushes, each of said brushes located proximal to and extending substantially the entire length of one of said slots.

9. The pet litter box according to claim 8, wherein said plurality of planar elements comprise at least a first imperforate planar element located in one of said grooves.

10. The pet litter box according to claim 9, further comprising:
    a perforated planar element located in one of said grooves and above said first imperforate planar element.

11. A pet litter box comprising:
    a monolithic housing including a first opening, a second opening, and defining a plurality of grooves within an interior surface of said housing and a plurality of slots, each of said slots connected to and associated with one of said grooves;
    a plurality of removable planar elements, each of said removable planar elements configured to slide through one of said slots and within one of said grooves so said removable planar elements may be removed from said housing; and
    a cleaning element connected to said housing, wherein said cleaning element is a brush extending substantially the entire length of one of said slots.

* * * * *